JORGE J. de MATTOS
INVENTOR.

BY
ATTORNEYS

Oct. 21, 1969   J. J. DE MATTOS   3,473,738
HOSE CONTROL DEVICE
Filed Nov. 29, 1967   2 Sheets-Sheet 2
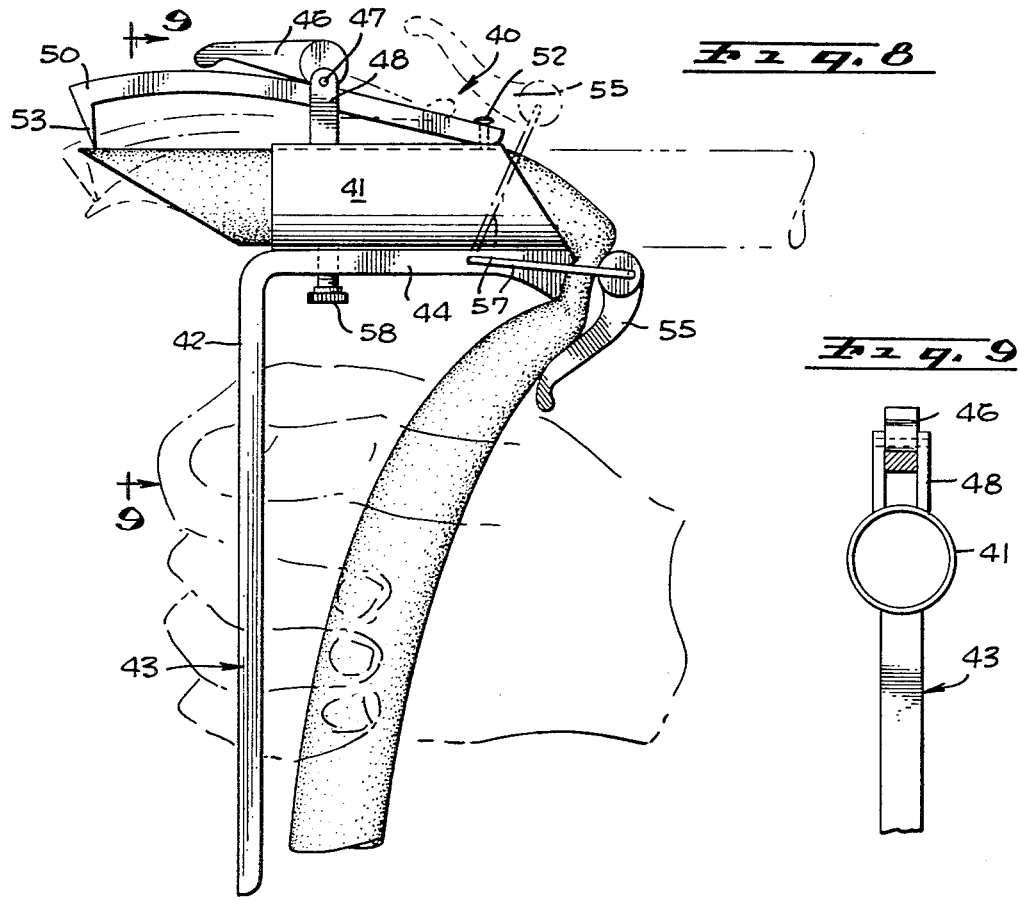
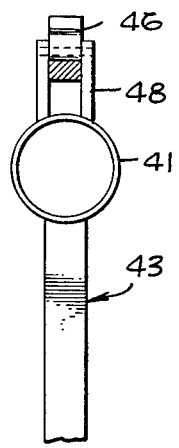
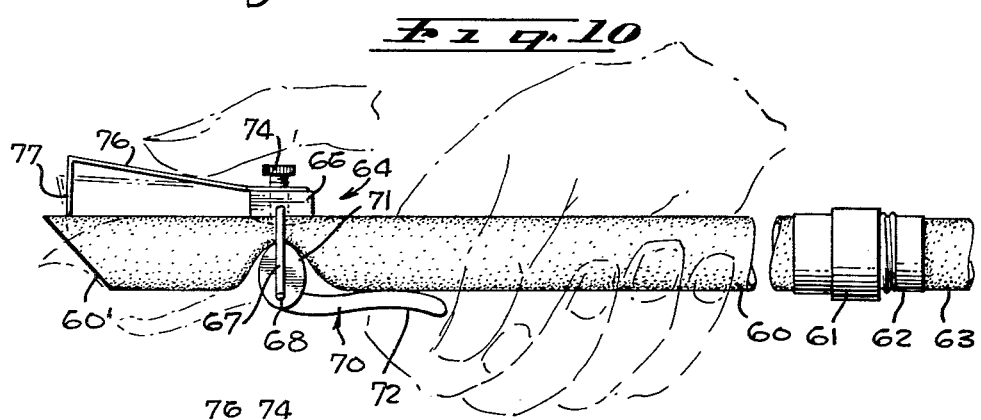
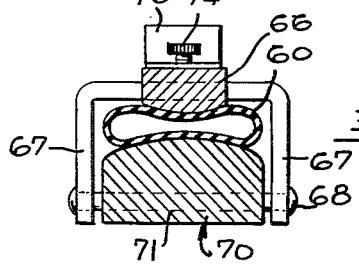
JORGE J. de MATTOS
INVENTOR.
BY
ATTORNEYS United States Patent Office 3,473,738
Patented Oct. 21, 1969

3,473,738
HOSE CONTROL DEVICE
Jorge J. de Mattos, 5111 Gloria Ave.,
Encino, Calif. 91316
Filed Nov. 29, 1967, Ser. No. 686,475
Int. Cl. B05b 1/26, 9/08, 15/00
U.S. Cl. 239—513                    13 Claims

ABSTRACT OF THE DISCLOSURE

The application discloses a device for use on the end of a hose for controlling the discharge of liquid therefrom and includes means for receiving a section of hose, means for deflecting the end of the hose section, and means for gripping and for compressing the hose section.

This invention has to do generally with means for controlling hoses to regulate the discharge of liquid therefrom and particularly with devices for garden hoses.

An object of the invention is to provide a device which can be detachably mounted on the end of the hose or hose section not having a fitting at such end and which is operable to vary the volume and flow pattern of water issuing from the hose and which is also operable to effect a shutoff.

Another object is to provide a simple, inexpensive device of the type indicated in which the end of the hose is received.

A further object is to provide a device for controlling a garden hose or the like which includes a short hose section with a fitting at one end adapted to attach to the fitting at the discharge end of a standard garden hose and means associated therewith for varying the flow pattern and volume.

These and other objects will be apparent from the drawings and the following description. Referring to the drawings, which are for illustrative purposes only:

Figure 1:
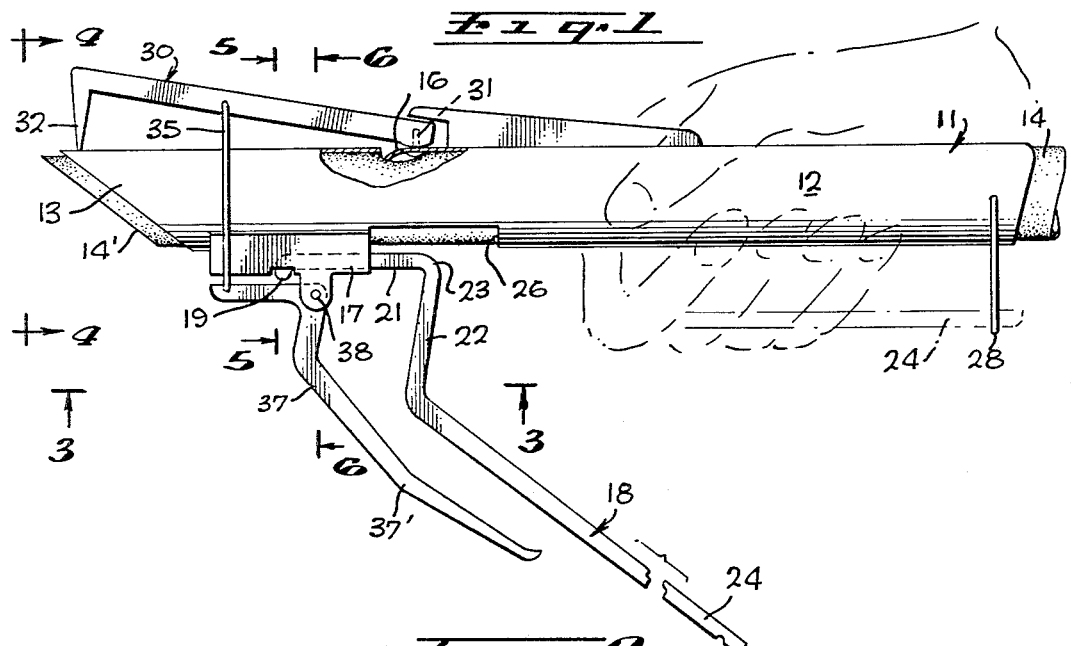
FIG. 1 is a side elevational view, partly broken away, of a device embodying the invention.
Figure 2:
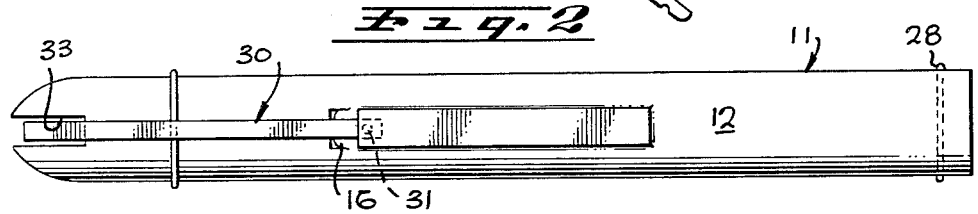
FIG. 2 is a plan view.
Figure 3:
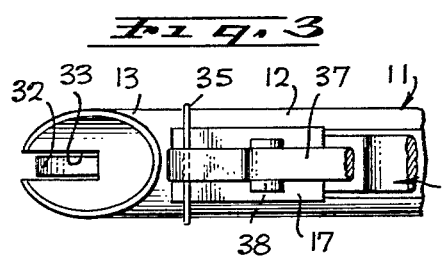
FIG. 3 is a fragmentary inverted plan view on line 3—3 of FIG. 1.
Figure 7:
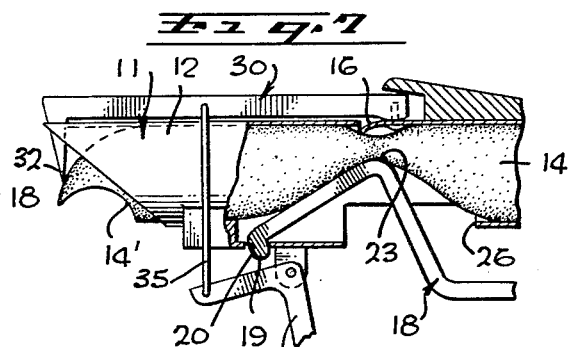
Figures 4, 5, 6:
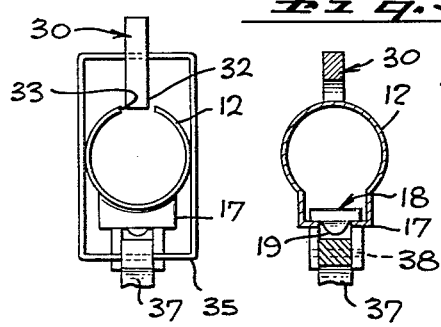

FIGS. 4, 5 and 6 are sectional views on lines 4—4, 5—5, and 6—6, respectively, of FIG. 1;

FIG. 7 is a fragmentary view similar to FIG. 1 but broken away to show parts in section and with the parts in a different position;

FIG. 8 is a view similar to FIG. 1, but showing a modification;

FIG. 9 is a fragmentary vertical sectional view on line 9—9 of FIG. 8;

FIG. 10 is a view similar to FIG. 1, but showing a modification; and

FIG. 11 is a sectional view on line 11—11 of FIG. 10, but on a larger scale.

More particularly describing the invention, referring first to FIGS. 1-7, reference numeral 11 generally designates a hose holder member which is shown as having a cylindrical tube 12, the forward end 13 of which is formed to extend in a plane which is at an angle intermediate the longitudinal axis of the body and a plane normal to such axis. The body may be made of metal or a substantially rigid plastic and is adapted to receive the discharge end portion or section 14 of a garden hose that does not have a coupling fitting at its end.

Preferably the hose is cut at its end so that the end edge 14' thereof is disposed in a plane corresponding to that of the end of the body. In order to retain the hose section in the holder member I provide an inturned tab or tooth 16 which is cut and formed from the wall of the body and this slightly dents or deforms the wall of the hose. The underside of the body is formed with a downwardly protruding rectangular portion 17 for the purpose of receiving a hose gripping member 18 in the form of a lever which has an offset inner end section 19 received in an opening 20. Beyond this the lever has a V-shaped laterally offset section 22 composed of the two legs 21 and 22 joined at an apex 23 and beyond this a straight handle section 24. When the handle section is pivoted toward the body 12 the offset section enters the body through an opening 26 and, depending upon the extent of movement of the lever, serves to compress the hose as shown in FIG. 7 up to a maximum of completely closing the passage therethrough. A bail 28 provided on the body can be used for holding the lever in the position of FIG. 7, as shown in broken lines in FIG. 1.

In order to deflect the stream of liquid issuing from the hose to control the flow pattern I provide a deflector 30 pivotally mounted on a screw 31 on the body 12. This has a laterally projecting pointed end 32 which bears against the discharge end of the hose, the body being slotted at 33 to accommodate the deflector. A bail-like link 35 connects this with a control lever 37 that is pivoted at 38 to the box housing 17. By manipulating the handle portion 37' the lever changes the configuration of the end of the hose section, as shown in FIG. 7, to vary the pattern of the discharge.

Referring now to FIGS. 8 and 9, I show a modification wherein the hose holder, here designated 40, comprises a short tube 41 fitted with an L-shaped strap 42 to form a handle 43, the member being welded, brazed or riveted along its section 44 to tube 41. In this form of the invention the hose extends through the tube, as before, but is adapted to be held by a person holding the handle, as indicated in FIG. 8. An adjustable overcenter camming lever 46 mounted on a pin 47 between a pair of posts 48 serves to adjustably position a hose deflector lever 50. The latter is mounted by a rivet 52 on the tube and has a laterally projecting pointed end 53 to bear against the hose.

At the other end of the tube I provide an overcenter camming lever 55 pivotally mounted on a bail 57 which in turn is pivotally mounted on section 44 of the handle, so that the hose can be gripped tightly to stop the flow of water therethrough when the device is in the position shown in FIG. 8. To permit flow of liquid, the lever is released and moved to the broken-line position. A screw 58 serves to retain the hose.

In FIGS. 10 and 11, I show a form of the invention having its own hose section 60 with a female fitting 61 at the end to attach to the male fitting 62 on the end of a conventional hose 63. Removably mounted on the hose section is a control device 64. This includes a block or first member 66 in which two downwardly extending L-shaped rods 67 are journaled to support a pin 68. A hose compressing member 70 is mounted on the pin, having an eccentric portion 71 about the pin and a handle 72 extending therefrom. When in the position of FIG. 10, the member 70 closes or substantially closes the passage through the hose section, but it will be apparent that the handle can be rotated to open the passage through the hose by moving it to the position shown in broken lines, or it may be selectively positioned at some intermediate point to vary the effective cross sectional area of the passage.

To assist in maintaining the device in place, I provide a thumbscrew 74 in member 66 which bears against the hose. Preferably the hose is formed with a beveled end 60' and I provide a deflector which may be operated by the thumb or forefinger, and this consists of a substantially L-shaped flat spring finger 76 which is mounted at one end in any suitable manner on the block 66 and has a short laterally projecting end 77 which bears against the hose section.

It will be apparent, of course, that the device 64 may be used on the end of any hose which does not have an end fitting, and also that, if desired, the hose section 60 with its fitting 61 at the end may be used with the devices shown in FIGS. 1 and 8, so that a complete unit is provided which can be readily attached to the end of the conventional garden hose that does have a fitting on the end.

Although I have shown and described preferred forms of my invention, I contemplate that various changes and modifications can be made therein without departing from the invention.

I claim:

1. An adjustable flow hose control device for use in combination with a hose section terminating in a discharge end free of a fitting, comprising a hose holder member receving said hose section, hose gripping means carried by said hose holder member, and manually operable adjustable hose deflecting means on said hose holder for deflecting the discharge end of the hose section.

2. The device set forth in claim 1 in which said hose gripping means includes manually operable means to compress said hose section and thereby selectively alter the normal cross-sectional shape and area of the passage therethrough or close the same.

3. The device set forth in claim 1 in which said hose deflecting means includes a lever pivotally mounted on the hose holder and having a free end bearing against one side of the discharge end of the hose section.

4. The device set forth in claim 1 in which said hose deflecting means includes a lever pivotally mounted on the hose holder and having a free end bearing against one side of the discharge end of the hose section, a handle pivotally mounted on said hose holder member and a link connecting said handle and said lever.

5. The device set forth in claim 1 in which said hose holder member is provided with means tending to hold a hose section therein against backward movement.

6. The device set forth in claim 4 in which said hose gripping means comprises a lever pivotally mounted on said hose holder member having a hose engaging section spaced radially from the pivotal point of the lever whereby the pivotal position of the lever determines the degree of grip upon the hose section.

7. The device set forth in claim 1 which said hose holder member is an open-ended tube.

8. An adjustable hose control device for use in combination with a hose section terminating in a discharge end free of a fitting, comprising a cylindrical hose holder member receiving said hose section, a hose gripping lever pivotally mounted on said member having an offset section intermediate its ends adapted to engage the side of the hose, said member being apertured to receive said offset section, means for releasably retaining said lever in position to tightly engage said hose and close the passage therethrough, a hose end deflector lever pivotally mounted on said hose holder member and having an end portion engageable with the end of said hose, and lever and linkage means mounted on said hose holder member for operating said deflector lever.

9. The device set forth in claim 8 in which the end of the device at the discharge end of the hose terminates in a plane the angle of which is inclined with reference to a plane normal to the axis of the member, and in which the hose is similarly formed at the discharge end, and in which said deflector lever engages said hose in the region of farthest extension of the member at said end.

10. A hose control device comprising a hose holder member adapted to receive the discharge end portion of a hose free of a fitting and having a front end and a back end, a handle on said member projecting laterally thereof, the hose being adapted to be bent at the back end of said member to lie close to said handle whereby a person holds the same and the handle in his hand, and adjustable means carried by said member for deflecting the discharge end of the hose.

11. The device set forth in claim 10 in which means is provided on said member for tightly gripping said hose to close the same.

12. A device for controlling water issuing from a garden hose, comprising a flexible hose section having a coupling fitting at one end and being free of any fitting at its other end, a member receiving said hose section, and adjustable means carried by said member for selectively deflecting the discharge end of said hose section, and means carried by said member for compressing the hose section.

13. A hose control device adapted to receive a hose section terminating in an end free of a fitting, comprising a block-like first member, a hose compressing second member opposite said first member, means pivotally supporting said second member in spaced relation to said first member, said second member having a handle and having a main portion eccentric about its pivotal axis of mounting whereby the distance between said members varies with the position of said second member, and a hose deflector finger mounted on said first member and extending forwardly thereof.

References Cited

UNITED STATES PATENTS

| 134,469 | 12/1872 | Day | 239—546 |
| 2,300,679 | 11/1942 | Klein | 239—546 X |

FOREIGN PATENTS 1,219 4/1872 Great Britain.

M. HENSON WOOD, JR., Primary Examiner

MICHAEL Y. MAR, Assistant Examiner

U.S. Cl. X.R.

239—516, 519, 530, 546, 602